United States Patent
Nagata

(10) Patent No.: US 12,518,258 B2
(45) Date of Patent: Jan. 6, 2026

(54) ELECTRONIC EQUIPMENT, RECORDING MEDIUM FOR RECORDING CONTENT USE PROGRAM, AND CONTENT USE METHOD

(71) Applicant: Roland Corporation, Shizuoka (JP)

(72) Inventor: Akihiro Nagata, Shizuoka (JP)

(73) Assignee: Roland Corporation, Shizuoka (JP)

( * ) Notice: Subject to any disclaimer, the term of this patent is extended or adjusted under 35 U.S.C. 154(b) by 178 days.

(21) Appl. No.: 18/082,536

(22) Filed: Dec. 15, 2022

(65) Prior Publication Data

US 2023/0206200 A1    Jun. 29, 2023

(30) Foreign Application Priority Data

Dec. 27, 2021    (JP) .............................. 2021-213304

(51) Int. Cl.
G06Q 20/12    (2012.01)
G10H 1/34    (2006.01)

(52) U.S. Cl.
CPC .......... *G06Q 20/1235* (2013.01); *G10H 1/34* (2013.01); *G10H 2220/066* (2013.01)

(58) Field of Classification Search
None
See application file for complete search history.

(56) References Cited

U.S. PATENT DOCUMENTS

| | | |
|---|---|---|
| 6,948,166 B2 | 9/2005 | Barfield et al. |
| 7,373,391 B2 | 5/2008 | Linuma |
| 2002/0073214 A1* | 6/2002 | Linuma ................... G06F 21/10 709/225 |
| 2004/0064380 A1* | 4/2004 | Hiratsuka .............. G06Q 10/10 705/26.1 |
| 2005/0091679 A1* | 4/2005 | Tanaka ................... H04H 20/83 725/100 |
| 2006/0124735 A1* | 6/2006 | Mizuno ................... G06F 21/10 235/382 |
| 2007/0033147 A1* | 2/2007 | Kaburagi ................ H04L 67/06 705/59 |
| 2013/0079910 A1* | 3/2013 | Hiratsuka ........... G10H 1/0066 700/94 |
| 2013/0247746 A1* | 9/2013 | Yamazaki .............. G09B 15/02 84/477 R |
| 2015/0089670 A1* | 3/2015 | Yanagawa ........... H04L 63/0876 726/28 |

FOREIGN PATENT DOCUMENTS

| | | |
|---|---|---|
| JP | 2003050921 | 2/2003 |
| JP | 2003115017 | 4/2003 |

(Continued)

*Primary Examiner* — Jamie R Kucab
(74) *Attorney, Agent, or Firm* — JCIPRNET

(57) ABSTRACT

An electronic equipment is provided. The electronic equipment includes: a content acquisition part for acquiring a content including a non-purchased content, which is a content that has not been purchased; a usage part for using the non-purchased content acquired by the content acquisition part regardless of whether the content has been purchased or not; and a prohibition part for prohibiting the usage part from using a non-purchased content that is the non-purchased content not being purchased after being acquired by the content acquisition part when a predetermined operation is performed.

8 Claims, 12 Drawing Sheets

(56) References Cited

FOREIGN PATENT DOCUMENTS

| | | |
|---|---|---|
| JP | 3882905 | 2/2007 |
| JP | 2010263580 | 11/2010 |
| JP | 5507116 | 5/2014 |
| JP | 6157711 | 7/2017 |
| JP | 2018092402 | 6/2018 |

* cited by examiner

Saving prohibition data 32c

| Tone color identifier | Saving prohibition |
|---|---|
| SD_A | ○ |
| SD_B | × |
| SD_C | × |
| SD_D | ○ |
| ⋮ | ⋮ |

FIG. 4(a)

Management information 72c

| User identifier | Tone color data | | |
|---|---|---|---|
| | Tone color identifier | Type | Purchase |
| US_A | SD_A | Subscription | Not yet |
| | SD_B | Permanent | Done |
| | SD_C | Subscription | Done |
| | SD_D | Permanent | Not yet |
| | ⋮ | ⋮ | ⋮ |
| US_B | SD_A | Subscription | Done |
| | SD_B | Permanent | Not yet |
| | SD_C | Subscription | Not yet |
| | SD_D | Permanent | Done |
| | ⋮ | ⋮ | ⋮ |
| ⋮ | | | |

FIG. 4(b)

ELECTRONIC EQUIPMENT, RECORDING MEDIUM FOR RECORDING CONTENT USE PROGRAM, AND CONTENT USE METHOD

CROSS-REFERENCE TO RELATED APPLICATION

This application claims the priority benefit of Japan application serial no. 2021-213304, filed on Dec. 27, 2021. The entirety of the above-mentioned patent application is hereby incorporated by reference herein and made a part of this specification.

BACKGROUND

Technical Field

The disclosure relates to an electronic equipment, a recording medium for recording a content use program, and a content use method.

Description of Related Art

Patent Literature 1 discloses a content information recording device 3 that may use content such as non-purchased music data, video data, text data, and the like within the range of trial conditions. A limit on the number of times of playback is indicated as a trial condition, and by playing the content whose number of times of playback is limited in the content information recording device 3, the user may grasp a part of the content before purchasing the content and may determine whether to purchase the content more specifically.

Related Art

Patent Literature

[Patent Literature 1] Japanese Patent Application Laid-Open No. 2003-115017

However, there are some contents, such as tone color data used for musical tones in electronic musical instruments and video material data used in video processing devices, in which the user may not grasp the contents unless the contents are used repeatedly. If the above trial condition is imposed on such contents, the user may not be able to determine with sufficient certainty whether to purchase the content. On the other hand, if trial use is permitted without imposing trial conditions on non-purchased content, there is a risk that the non-purchased content will continue to be used unauthorizedly.

SUMMARY

The disclosure has been made in view of the above issues, and the disclosure provides an electronic equipment, a content use program, and a content use method, which allow the user to fully trial use the contents of non-purchased content while preventing the unauthorized continued use of the non-purchased content.

Solution to Problem

An electronic equipment according to the disclosure in view of the above issues includes:
  a content acquisition part for acquiring a content including a non-purchased content, which is a content that has not been purchased;
  a usage part for using the non-purchased content acquired by the content acquisition part regardless of whether the content has been purchased or not; and
  a prohibition part for prohibiting the usage part from using a non-purchased content that is the non-purchased content not being purchased after being acquired by the content acquisition part when a predetermined operation is performed.

A recording medium for recording a content use program according to the disclosure is a recording medium for recording a content use program for executing use processing for causing a computer to use a content including a non-purchased content, which is a content that has not been subjected to purchase processing, and the content use program causes the computer to execute:
  a content acquisition step for acquiring the non-purchased content;
  a usage step for using the non-purchased content acquired in the content acquisition step regardless of whether the content has been purchased or not; and a prohibition step for prohibiting the usage step from using a non-purchased content that is the non-purchased content not subjected to the purchase processing when a predetermined operation is performed.

Further, a content use method according to the disclosure includes:
  acquiring a content including a non-purchased content, which is a content that has not been purchased;
  using the acquired content indiscriminately regardless of whether the acquired content has been purchased or not; and
  prohibiting the using of the content that is the acquired content and that has not been subjected to purchase processing when a predetermined operation is performed.

BRIEF DESCRIPTION OF THE DRAWINGS

FIG. 4(a) is a diagram schematically showing the saving prohibition data.

FIG. 4(b) is a diagram schematically showing the management information.

DESCRIPTION OF EMBODIMENTS

Figure 1:
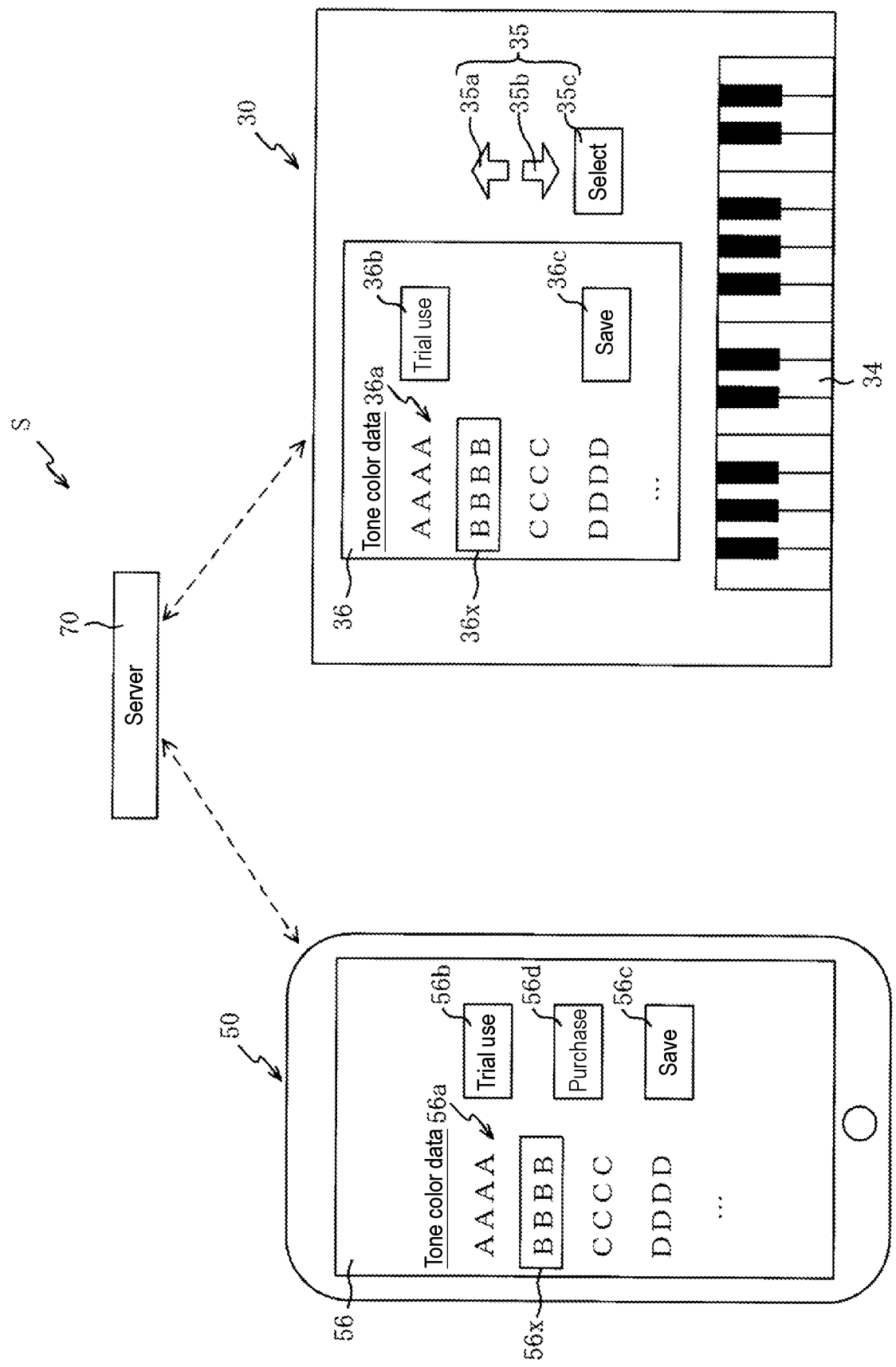
FIG. 1 is a diagram showing an overview of a content use system.

Hereinafter, exemplary embodiments will be described with reference to the accompanying drawings. An overview of a content use system S of this embodiment will be described with reference to FIG. 1. FIG. 1 is a diagram showing an overview of the content use system S. As shown in FIG. 1, the content use system S includes an electronic musical instrument 30, a portable terminal 50, and a server 70. The electronic musical instrument 30 and the server 70 are configured to be able to communicate with each other, and the portable terminal 50 and the server 70 are also configured to be able to communicate with each other.

The electronic musical instrument 30 is a device (electronic equipment) that produces musical tones based on the performance of a user H. The electronic musical instrument 30 is provided with a keyboard 34 for acquiring performance information by the user H, setting keys 35 for the user H to input various settings, and an LCD 36 for displaying settings of the electronic musical instrument 30 and the like. The setting keys 35 further include an up key 35a and a down key 35b for moving a selection cursor 36x (to be described later) for selecting a selection item displayed on a liquid crystal display (LCD) 36, and a selection key 35c for determining the selection of the selection item selected by the selection cursor 36x.

Further, the electronic musical instrument 30 is provided with tone color data having tone color information, and acquires tone colors corresponding to the selection by the user H from the tone color data and outputs them as musical tones. The tone color data is data (content) including multiple variable values (information for envelopes of attack, decay, sustain and release, and the like) relating to tone color. The electronic musical instrument 30 processes sound according to the variable values set in the tone color data selected by the user H, and produces the processed tone colors. The tone color data is acquired from the server 70 in addition to the tone color data that is installed in the electronic musical instrument 30 at the time of shipment from the factory.

The tone color data of the server 70 is sold to the user H, and the tone color data purchased by the user H is transmitted to the electronic musical instrument 30, and the content of the tone color data may be used in the electronic musical instrument 30 without limitation. Here, "unlimited use of tone color data" in this embodiment means that all of the tone colors included in the tone color data read in order to produce musical tones in the electronic musical instrument 30 may be used without limitation until other tone color data is read or the power of the electronic musical instrument 30 is turned off.

Further, "purchase of tone color data" includes a case where the user H purchases the right to permanently use a piece of tone color data or a package of multiple pieces of tone color data that the user H desires to use, and a case where the user H purchases a subscription authority for the tone color data (hereinafter referred to as the "subscription authority").

The subscription authority represents the type of contract for the use of services by the user H such as tone color data on the server 70, and is set with multiple levels of authority (specifically, "normal," "core," "pro" and "ultimate"). The user H may acquire from the server 70 and use the tone color data and the like that are permitted to be used at that level by purchasing the subscription authority of the desired level. Hereinafter, tone color data for which the right to use permanently is purchasable will be referred to as "permanent tone color data," and tone color data that may be used by purchasing the subscription authority will be referred to as "tone color data by subscription authority."

In this embodiment, the electronic musical instrument 30 is configured so that the content of the non-purchased tone color data, which is tone color data that has not undergone purchase processing, may be used without limitation until the power of the electronic musical instrument 30 is turned off. Trial use of the non-purchased tone color data in the electronic musical instrument 30 will be described later.

The portable terminal 50 is a terminal (information processing device, computer) that performs processing according to instructions input by the user H. The portable terminal 50 is provided with an LCD 56 as a display device. In response to an instruction from the user H, the portable terminal 50 may transmit an instruction to purchase the tone color data on the server 70, or transmit an instruction to trial use the non-purchased tone color data on the server 70 on the electronic musical instrument 30.

Here, the trial use of non-purchased tone color data in the electronic musical instrument 30 will be described. The LCD 36 of the electronic musical instrument 30 displays a tone color data list 36a in which names of tone color data on the server 70 are listed. Purchased tone color data purchased by the user H and non-purchased tone color data not purchased by the user H are displayed in the tone color data list 36a.

The LCD 36 displays the selection cursor 36x for selecting items displayed on the LCD 36. The user H operates the up key 35a or the down key 35b of the setting keys 35 to move the selection cursor 36x to the name of desired tone color data in the tone color data list 36a. When the user H operates the selection key 35c of the setting keys 35, the selection of tone color data from the tone color data list 36a is determined. Hereinafter, moving the selection cursor 36x to a selection item such as a key displayed on the LCD 36 and determining the selection by operating the selection key 35c is simply referred to as "selection."

The LCD 36 also displays a trial use key 36b. The trial use key 36b is a key for starting trial use of the non-purchased tone color data selected in the tone color data list 36a. The trial use key 36b is displayed in an operable way (for example, displayed with a solid line) when the selected tone color data in the tone color data list 36a is non-purchased tone color data. In addition, if the selected tone color data in the tone color data list 36a is purchased tone color data, the trial use key 36b is displayed in an inoperable way (for example, displayed with a dotted line).

When non-purchased tone color data is selected from the tone color data list 36a and the trial use key 36b is operated, the non-purchased tone color data whose selection has been determined is acquired from the server 70, and it is set (loaded) to the tone color data that is actually (currently) used for sound production by the electronic musical instrument 30.

At this time, the non-purchased tone color data acquired from the server 70 is stored in a work memory 33a (see FIG. 3), which is a volatile memory. In trial use, the contents of the non-purchased tone color data stored in the work memory 33a may be used without limitation. The tone color data includes multiple tone colors, and various musical tones are output based on the performance information acquired from a keyboard 34.

For this reason, in order for the user H to determine whether the tone color of the tone color data matches the tune he or she is playing, a relatively long use of tone color data is required, such as repeating sound production of a combination of multiple tone colors of the tone color data. In the trial use of such tone color data, if the number of times the tone color data is read out or the tone color data that may be produced is limited, the user H may not fully evaluate the tone color data.

Therefore, with unlimited use of the non-purchased tone color data acquired from the server 70 allowed, the user H may fully trial use the tone colors included in the non-purchased tone color data and may suitably determine whether to purchase the non-purchased tone color data.

In addition, the non-purchased tone color data acquired from the server 70 is stored in the volatile work memory 33a. After trial use of the non-purchased tone color data, the user H inputs an operation to turn off the electronic musical instrument 30, and when the electronic musical instrument 30 is turned off, the non-purchased tone color data is deleted from the work memory 33a. In this way, afterwards, since the non-purchased tone color data may not be used when the power of the electronic musical instrument 30 is turned on, continuous or repeated unauthorized use of the non-purchased tone color data may be prevented.

Next, continuous use of the tone color data in the electronic musical instrument 30 after the purchase of the non-purchased tone color data will be described. The LCD 36 also displays a save key 36c. The save key 36c is used to save purchased tone color data in a non-volatile tone color memory 32b (see FIG. 3) of the electronic musical instrument 30.

If the tone color data selected in the tone color data list 36a is not saved in the tone color memory 32b, the save key 36c is displayed in an operable way (for example, displayed with a solid line), and if it is saved in the tone color memory 32b, the save key 36c is displayed in an inoperable way (for example, displayed with a dotted line).

When tone color data is selected from the tone color data list 36a and the save key 36c is operated, it is confirmed whether the selected tone color data has been purchased from the server 70. If the tone color data has already been purchased, the tone color data is stored in the tone color memory 32b. After that, the tone color data stored in the tone color memory 32b is copied to the work memory 33a in response to an instruction from the user H, and set as the tone color data actually used for sound production by the electronic musical instrument 30.

In this way, since the purchased tone color data is stored in the non-volatile tone color memory 32b, even if the power of the electronic musical instrument 30 is turned off and then turned on, the state in which the tone color data is stored in the tone color memory 32b may be maintained. In this way, when the user H likes the non-purchased tone color data that has been put to trial use and purchases it, the tone color data may be continuously and repeatedly used in the electronic musical instrument 30.

In addition, if the tone color data selected in the tone color data list 36a has not yet been purchased and the save key 36c is operated in that state, the LCD 36a will display a message reading "please purchase the tone color data BBBB" or the like to prompt purchase of the tone color data (not shown). This allows the user H to know that the tone color data has not been purchased and cannot be saved, and motivates the user H to purchase the tone color data.

By the way, in this embodiment, purchase of tone color data is performed at the portable terminal 50. The LCD 56 of the portable terminal 50 is provided with a tone color data list 56a, a selection cursor 56x, a trial use key 56b, a save key 56c, and a purchase key 56d.

In the tone color data list 56a, names of tone color data on the server 70 are displayed in a list, like the tone color data list 36a of the electronic musical instrument 30 described above. Like the selection cursor 36x of the electronic musical instrument 30, the selection cursor 56x is used to select selection items such as the names of tone colors in the tone color data list 56a displayed on the LCD 56. Moving the selection cursor 56x and determining the selection of a selection item is simply referred to as "selection."

Like the trial use key 36b of the electronic musical instrument 30 described above, the trial use key 56b is a key that allows the electronic musical instrument 30 to try out the non-purchased tone color data selected in the tone color data list 56a via the server 70. Like the save key 36c of the electronic musical instrument 30, the save key 56c is the key that saves the tone color data, which has been purchased or whose subscription authority is valid, selected in the tone color data list 56a to the tone color memory 32b of the electronic musical instrument 30 via the server 70.

The purchase key 56d is a key for purchasing non-purchased tone color data selected in the tone color data list 56a. The purchase key 56d is displayed in an operable way (for example, displayed with a solid line) when the selected tone color data in the tone color data list 56a is non-purchased tone color data. In addition, if the selected tone color data in the tone color data list 56a is purchased tone color data, the purchase key 56d is displayed in an inoperable way (for example, displayed with a dotted line).

By operating the purchase key 56d, if the non-purchased tone color data selected in the tone color data list 56a is permanent tone color data, the purchase processing of the tone color data is performed. Further, if the non-purchased tone color data selected in the tone color data list 56a is tone color data by subscription authority, the level of subscription authority at which the user H has the authority to use the tone color data is displayed, and the purchase processing of the subscription authority of the level selected by user H is performed. In this way, the non-purchased tone color data is changed to the purchased tone color data, and the tone color data may be saved in the tone color memory 32b by operating the save key 36c or the like.

Figure 2:
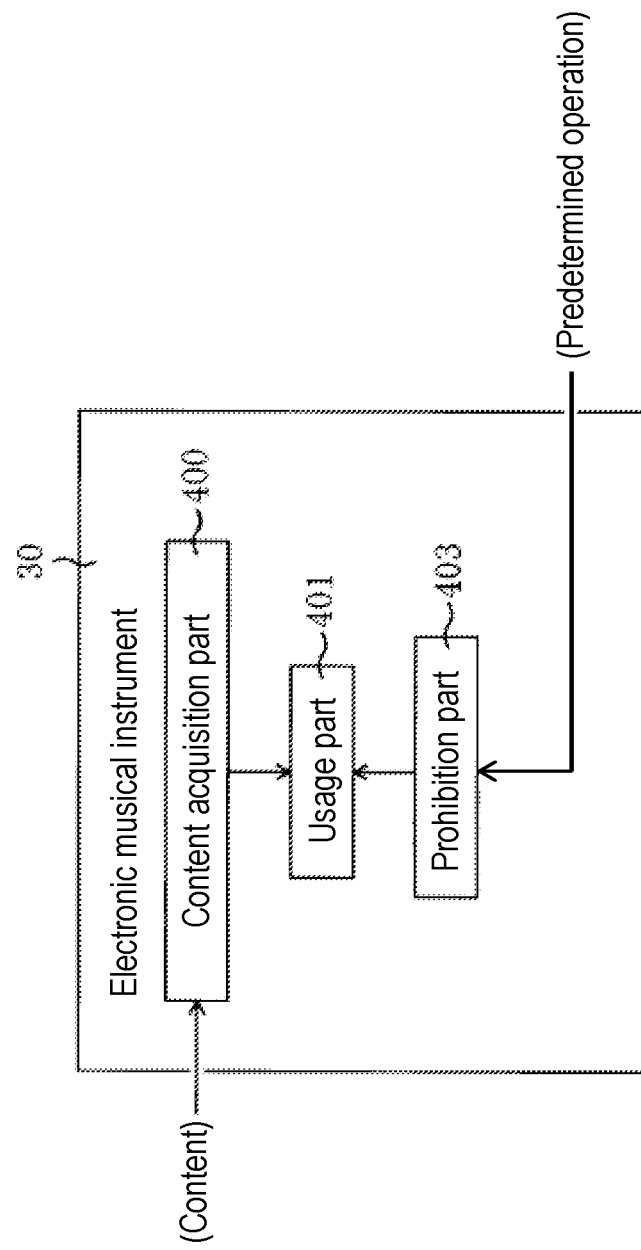
FIG. 2 is a functional block diagram of the electronic musical instrument.

Next, functions of the electronic musical instrument 30 will be described with reference to FIG. 2. FIG. 2 is a functional block diagram of the electronic musical instrument 30. As shown in FIG. 2, the electronic musical instrument 30 includes a content acquisition part 400, a usage part 401 and a prohibition part 403.

The content acquisition part 400 is a part for acquiring a content including a non-purchased content, which is a content that has not been purchased, and is implemented by a central processing unit (CPU) 31 to be described later with reference to FIG. 3. The usage part 401 is a part for using the non-purchased content acquired by the content acquisition part 400 regardless of whether the content has been purchased or not, and is implemented by the CPU 31. A predetermined operation is acquired by the CPU 31. The prohibition part 403 is a part for prohibiting the usage part 401 from using a non-purchased content in a case that the non-purchased content is not being purchased after being acquired by the content acquisition part 400 when the predetermined operation is performed, and is implemented by the CPU 31.

In the electronic musical instrument 30, since the contents of the non-purchased content may be used, the user H may fully use the contents of the non-purchased content and may determine whether to purchase it. In addition, when the predetermined operation is acquired, use of non-purchased content for which purchase processing has not yet been performed is prohibited. In this way, the non-purchased content may be prevented from unauthorized use without being purchased.

Next, the electrical configuration of the content use system S will be described with reference to FIGS. 3, 4(a) and 4(b). FIG. 3 is a block diagram showing the electrical configuration of the content use system S. The electronic musical instrument 30 includes a CPU 31, a flash ROM 32, a RAM 33, the keyboard 34, the setting keys 35 and the LCD 36, a communication device 37 that communicates with the server 70, a sound source 38, a digital signal processor 39 (hereinafter referred to as the "DSP 39"), which are connected via a bus line 40 respectively.

Figure 5:
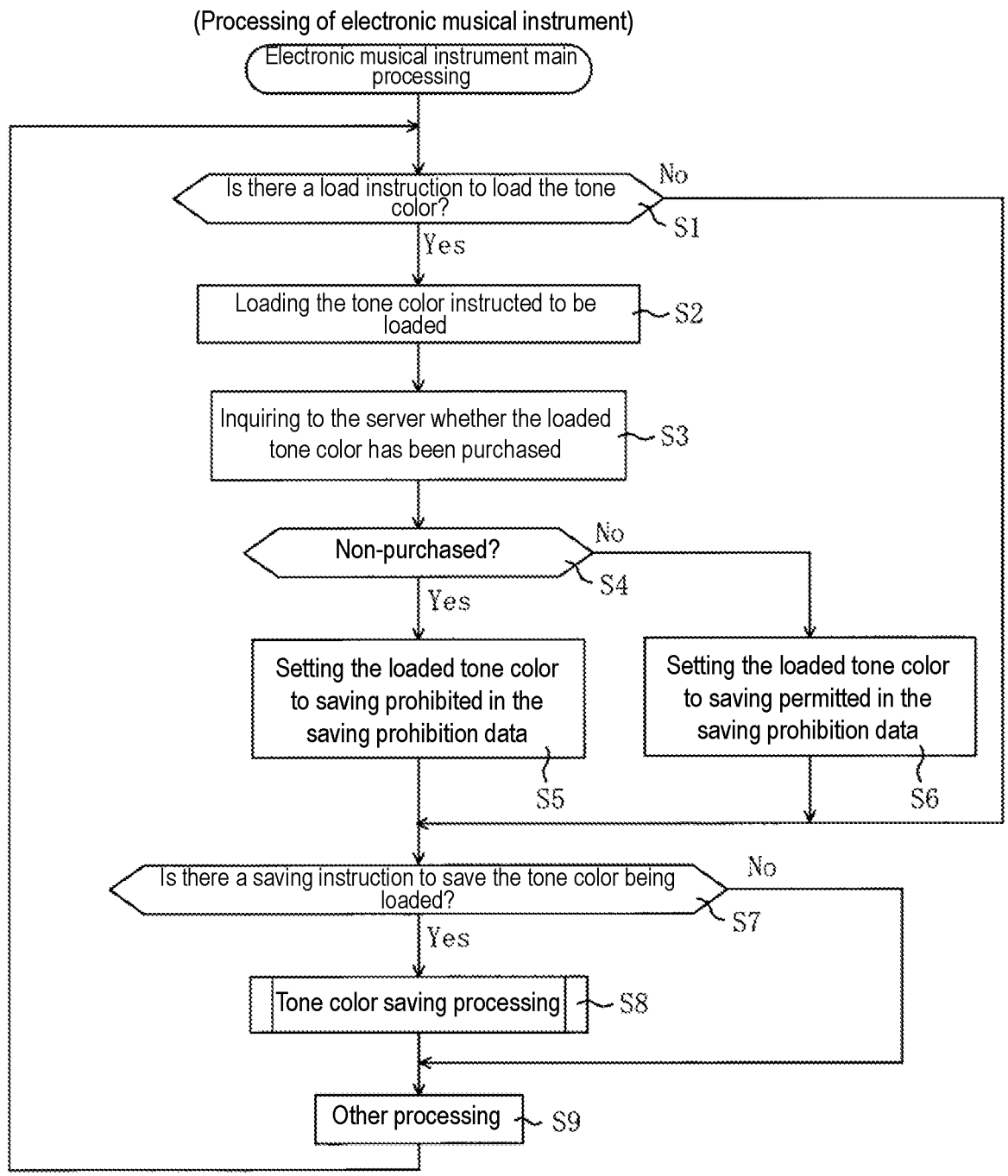
FIG. 5 is a flowchart of the electronic musical instrument main processing.

The CPU 31 is a computing device that controls each part connected by the bus line 40. The flash ROM 32 is a rewritable nonvolatile storage device that stores programs to be executed by the CPU 31, fixed value data, and the like, and includes a control program 32a, the tone color memory 32b, and saving prohibition data 32c. When the control program 32a is executed by the CPU 31, the electronic musical instrument main processing of FIG. 5 is executed. The saving prohibition data 32c is a data table in which whether each tone color data may be saved in the tone color memory 32b is set. The saving prohibition data 32c will be described with reference to FIG. 4(a).

FIG. 4(a) is a diagram schematically showing the saving prohibition data 32c. In the saving prohibition data 32c, for each tone color identifier, which is an identifier uniquely assigned to the tone color data, if the tone color data has been purchased and may be saved in the tone color memory 32b, a saving permission ("O" in the figure) is set to that effect, and if the tone color data has not been purchased and cannot be saved in the tone color memory 32b, a saving prohibition "X" is set to that effect. Hereinafter, information in which such a tone color identifier and saving permission or saving prohibition corresponding to the tone color data of the tone color identifier are set will be referred to as "saving prohibition data."

Please return to FIG. 3. The RAM 33 is a volatile memory for rewritably storing various work data, flags, and the like when the CPU 31 executes a program, and includes the work memory 33a described above.

The sound source 38 is a device that outputs waveform data based on the current tone color data in the work memory 33a according to performance information input from the keyboard 34. The DSP 39 is a computing device for computing processing the waveform data input from the sound source 38. The sound source 38 and a digital-to-analog converter (DAC) 41 are connected to the DSP 39, and an amplifier 42 is connected to the DAC 41, and a speaker 43 is connected to the amplifier 42.

Next, the electrical configuration of the portable terminal 50 will be described. The portable terminal 50 includes a CPU 51, a flash ROM 52, and a RAM 53 that is volatile memory, which are connected to an input/output port 55 via a bus line 54. The input/output port 55 is further connected with a communication device 61 that communicates with the server 70, the LCD 56 described above, and a touch panel 57 through which instructions from the user H are input.

The flash ROM 52 is a rewritable non-volatile storage device that stores programs to be executed by the CPU 51, fixed value data, and the like, and stores a portable program 52a. When the portable program 52a is executed by the CPU 51, the tone color data display processing and the tone color data purchase processing on the server 70 described above with reference to FIG. 1 are executed.

Next, the electrical configuration of the server 70 will be described. The server 70 includes a CPU 71, a hard disk drive 72 (hereinafter referred to as the "HDD 72"), and a RAM 73 that is a volatile memory for rewritably storing various work data, flags, and the like when the CPU 71 executes a program, and these are connected to an input/output port 75 via a bus line 74 respectively. A communication device 76 that communicates with the electronic musical instrument 30 and the portable terminal 50 is also connected to the input/output port 75.

The CPU 71 is a computing device that controls each part connected by the bus line 74. The HDD 72 is a rewritable non-volatile storage device that stores programs to be executed by the CPU 71, fixed value data, and the like, and the HDD 72 includes a server program 72a, a tone color DB 72b that stores multiple pieces of tone color data, and management information 72c. When the server program 72a is executed by the CPU 71, transmission of the tone color data to the electronic musical instrument 30, purchase processing in response to an instruction to purchase the tone color data received from the portable terminal 50, and the like are executed. The management information 72c will be described with reference to FIG. 4(b).

FIG. 4(b) is a diagram schematically showing the management information 72c. Information on the tone color data stored in the tone color DB 72b is stored in the management information 72c for each user identifier indicating the user H who uses the electronic musical instrument 30. As the information of the tone color data, the tone color identifier of the tone color data, the type of the tone color data representing the tone color data by subscription authority ("subscription" in the figure) or permanent tone color data ("permanent" in the figure), and the purchase status of the tone color data of the corresponding user H—purchased ("done" in the figure) or not purchased ("not yet" in the figure)—are stored in association with each other.

Please return to FIG. 3. The RAM 73 is a volatile memory for rewritably storing various work data, flags, and the like when the CPU 71 executes a program.

Next, processing executed by the CPU 31 of the electronic musical instrument 30 will be described with reference to FIGS. 5 and 6. FIG. 5 is a flowchart of the electronic musical instrument main processing. The electronic musical instrument main processing is processing that is executed when the power of the electronic musical instrument 30 is turned on. In the electronic musical instrument main processing, first, it is confirmed whether a load instruction to load tone color data has been received (S1). When an instruction to copy the purchased tone color data stored in the tone color memory 32b to the work memory 33a is received in a case where the trial use key 36b of the electronic musical instrument 30 or the trial use key 56b of the portable terminal 50 described above in FIG. 1 is operated, it is determined that the load instruction has been received.

In the processing of S1, if a load instruction is issued (S1: Yes), the tone color data instructed to be loaded is acquired and copied to the work memory 33a for loading (S2). In the processing of S2, when non-purchased tone color data is loaded for trial use, the tone color data is loaded from the server 70, and when purchased tone color data is loaded, the tone color data is loaded from the server 70 or the tone color memory 32b.

After the processing of S2, the server 70 is inquired as to whether the loaded tone color data has been purchased, that is, about the purchase status of the tone color data (S3). When the server 70 receives an inquiry from the electronic musical instrument 30, the server 70 refers to the user identifier of the user H of the electronic musical instrument 30 and the tone color identifier of the tone color data that is the inquiry target in the management information 72c, and acquires the purchase status of the tone color data. The server 70 then transmits the acquired purchase status to the electronic musical instrument 30.

After the processing of S3, it is confirmed whether the purchase status inquired of the server 70 is non-purchased (S4). In the processing of S4, if the purchase status is non-purchased (S4: Yes), the tone color data loaded in the processing of S2 is set to saving prohibited in the saving prohibition data 32c (that is, "X" in FIG. 4(a)) (S5). On the other hand, in the processing of S4, if the purchase status is purchased (S4: No), the tone color data loaded in the processing of S2 is set to saving permitted in the saving prohibition data 32c (that is, "O" in FIG. 4(a)) (S6).

In the processing of S1, if no load instruction is issued (S1: No), the processing of S2 to S6 is skipped.

After the processing of S1, S5 and S6, it is confirmed whether there is an instruction to save the tone color data being loaded in the work memory 33a (S7). Specifically, in the processing of S7, it is confirmed whether the save key 36c or the save key 56c described above with reference to FIG. 1 has been operated. In the processing of S7, if there is an instruction to save the tone color data (S7: Yes), the tone color saving processing (S8) is executed. Here, the tone color saving processing will be described with reference to FIG. 6.

Figure 6:
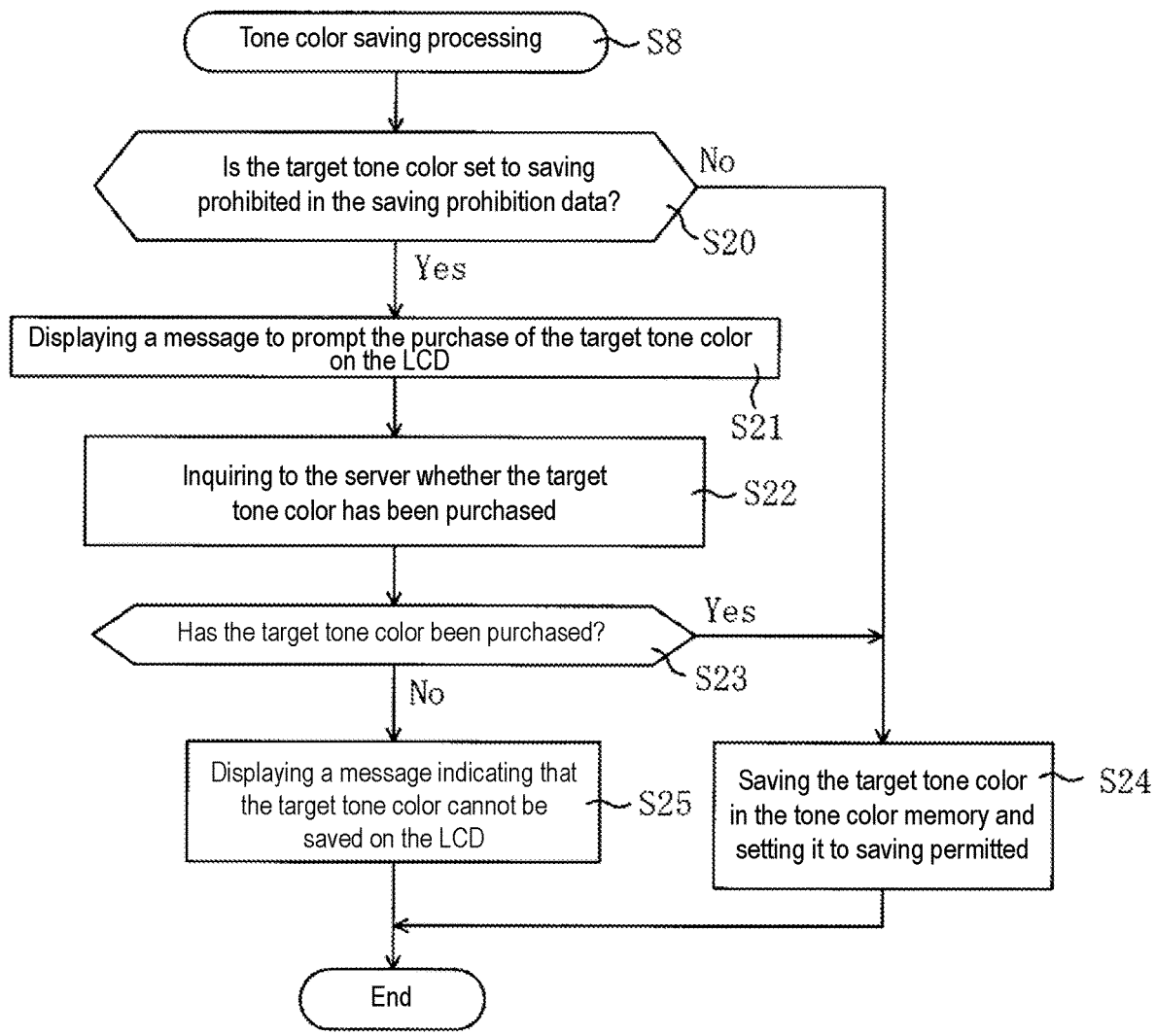
FIG. 6 is a flowchart of the tone color saving processing.

FIG. 6 is a flowchart of the tone color saving processing. In the tone color saving processing, first, it is confirmed whether the target tone color data that has been instructed to be saved in the processing of S7 in FIG. 5 (hereinafter referred to as the "target tone color data") is set to saving prohibited in the saving prohibition data 32c (S20). In the processing of S20, if the target tone color data is set to saving prohibited (S20: Yes), a message prompting the purchase of the target tone color data is displayed on the LCD 36 (S21). When the user H performs a save operation from the portable terminal 50, a message prompting purchase of the target tone color data may be displayed on the LCD 56 of the portable terminal 50.

After the processing of S21, in response to the message displayed in the processing of S21, in order to confirm whether the user H has purchased the target tone color data, the server 70 is inquired about the purchase status of the target tone color data (S22). When the server 70 receives an inquiry from the electronic musical instrument 30, the server 70 refers to the user identifier of the user H of the electronic musical instrument 30 and the tone color identifier of the target tone color data in the management information 72c, and acquires the purchase status of the tone color data. The server 70 then transmits the acquired purchase status to the electronic musical instrument 30.

Considering the time required for the user H to issue a purchase instruction to the portable terminal 50, the inquiry to the server 70 in the processing of S22 may be made after a predetermined time (for example, 3 minutes) after the message is displayed in the processing of S21.

After the processing of S22, it is confirmed whether the purchase status of the target tone color data is "purchased" (S23). In the processing of S23, if the target tone color data has been purchased (S23: Yes), the target tone color data is saved in the tone color memory 32b, and the tone color data loaded in the processing of S2 is set to saving permitted in the saving prohibition data 32c (that is, "O" in FIG. 4(a)) (S24).

As described above, when the user H tries to save the non-purchased target tone color data in the tone color memory 32b in order to continuously use it, the user H may understand that the tone color data is non-purchased from the message in the processing of S21. When the user H purchases the tone color data using the portable terminal 50, the tone color data becomes purchased, and the tone color data is saved in the tone color memory 32b. In this way, the target tone color data originally non-purchased is stored in the tone color memory 32b as the purchased tone color data, so the electronic musical instrument 30 may repeatedly use the tone color data.

On the other hand, if the target tone color data has not been purchased in the processing of S23 (S23: No), a message indicating that the target tone color data cannot be saved is displayed on the LCD 36 (S25). In this case as well, when the user H performs a save operation from the portable terminal 50, a message indicating that the target tone color data cannot be saved may be displayed on the LCD 56 of the portable terminal 50.

In the processing of S20, if the target tone color data is set to saving permitted (S20: No), the target tone color data is saved in the tone color memory 32b by the above-described processing of S24 (S24). The saving of the tone color data by the processing of S20 and S24 includes: a case where the tone color data acquired in the non-purchased status is trial-used on the electronic musical instrument 30, and after the user H purchases the tone color data on the portable terminal 50, the tone color data is saved in the tone color memory 32b; a case where the tone color data originally purchased is acquired from the server 70 and used for the performance of the electronic musical instrument 30, and then the tone color data is saved in the tone color memory 32b; and the like.

After the processing of S24 and S25, the tone color saving processing ends.

Please return to FIG. 5. In the processing of S7, if there is no instruction to save the tone color data (S7: No), the tone color saving processing of S8 is skipped. After the processing of S7 and S8, other processing of the electronic musical instrument 30 is executed (S9), and the processing from S1 onward is repeated. More specifically, examples of other processing of S9 include acquisition of input of various settings by the user's setting key and processing associated with it, display of electronic musical instrument settings and the like on the LCD, acquisition of performance information input from the keyboard 34, output of musical tones based on the performance information, and sound production combining multiple musical tones.

Next, a second embodiment will be described with reference to FIGS. 7 to 12. In the first embodiment described above, the electronic musical instrument 30 directly acquires the non-purchased tone color data from the server 70 by communication. In contrast, an electronic musical instrument 300 of the second embodiment acquires non-purchased tone color data from the server 700 via a recording medium 100. The same reference numerals are assigned to the same parts as in the first embodiment, and the description thereof will be omitted.

Figure 7:
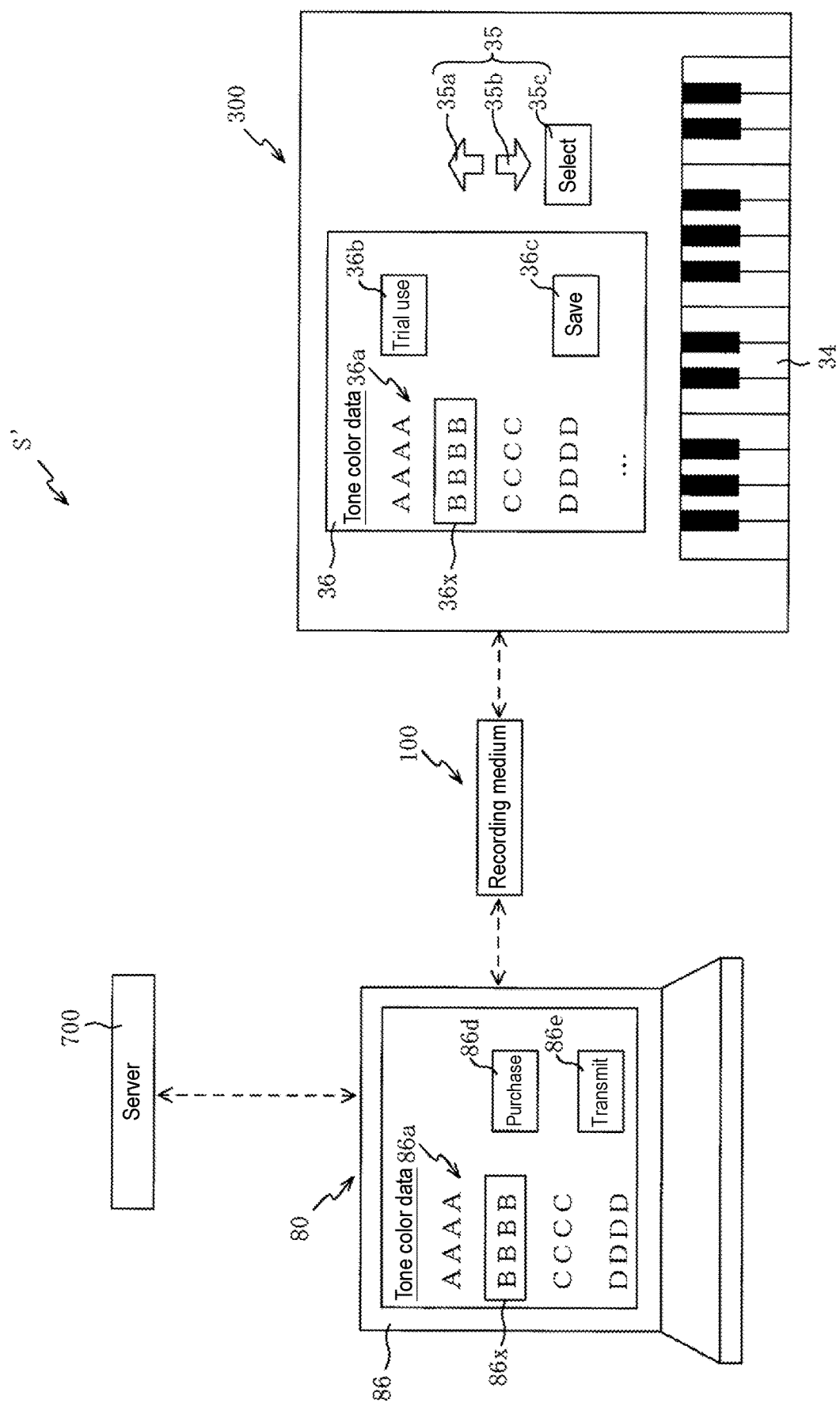
FIG. 7 is a diagram showing an overview of a content use system according to a second embodiment.

FIG. 7 is a diagram showing an overview of a content use system S' according to a second embodiment. The content use system S' is provided with a PC 80 and a recording medium 100 while the portable terminal 50 from the content use system S of the first embodiment is omitted.

The PC 80 is an information processing device (computer) that performs processing according to instructions input by the user H, and is configured to be able to communicate with the server 700. The PC 80 is provided with an LCD 86 as a display device. The LCD 86 is provided with a tone color data list 86*a* displaying a list of tone color data names on the server 700, a selection cursor 86*x*, a purchase key 86*d* for purchasing non-purchased tone color data selected in the tone color data list 86*a*, and a transmit key 86*e*.

Like the selection cursor 36*x* of the electronic musical instrument 300, the selection cursor 86*x* is used to select selection items such as the names of tone colors in the tone color data list 86*a* displayed on the LCD 86. Moving the selection cursor 86*x* and confirming the selection of a selection item is simply referred to as "selection."

The transmit key 86*e* is a key for transmitting the tone color data selected in the tone color data list 86*a* to the recording medium 100. By operating the transmit key 86*e*, the saving prohibition data created by the server 700 is transmitted to the recording medium 100 together with the tone color data selected in the tone color data list 86*a*.

The recording medium 100 is a rewritable non-volatile storage device, and is configured to be attachable/detachable to/from the PC 80 and the electronic musical instrument 300, respectively. The tone color data and saving prohibition data acquired from the server 700 are transmitted to the electronic musical instrument 300 via the recording medium 100.

In the electronic musical instrument 300, the tone color data list 36*a* displays the tone color data included in the tone color memory 32*b* and the tone color data stored in the recording medium 100. Since the tone color data acquired from the recording medium 100 also includes non-purchased tone color data, the non-purchased tone color data may be trial used in the same manner as in the first embodiment.

Further, when the tone color data stored in the recording medium 100 is to be saved by operating the save key 36*c*, the saving prohibition data stored in the recording medium 100 is referred to. The saving prohibition data stored in the recording medium 100 is set in advance based on the management information 72*c* of the server 700 to permit or prohibit saving of each piece of tone color data of the user H who uses the electronic musical instrument 300. Therefore, by referring to the saving prohibition data stored in the recording medium 100, the electronic musical instrument 300 may determine whether the tone color data may be saved in the tone color memory 32*b* without directly communicating with the server 700.

In this way, even if the electronic musical instrument 300 cannot directly communicate with the server 700 due to an insufficient communication environment, the electronic musical instrument 300 may allow the trial use of the non-purchased tone color data and save the purchased tone color data in the memory 32*b* via the recording medium 100.

Figure 8:
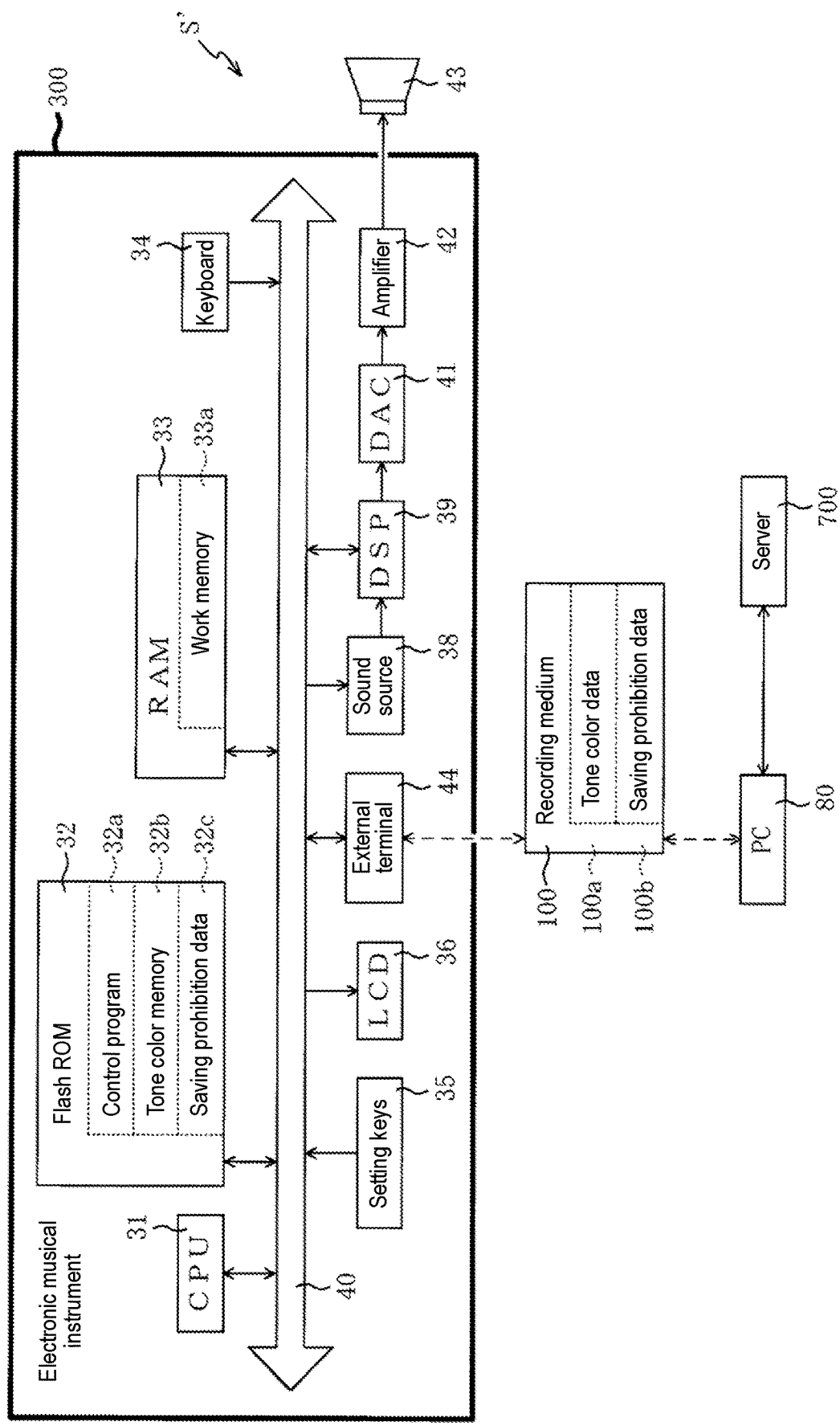
FIG. 8 is a block diagram showing the electrical configuration of the electronic musical instrument and the recording medium of the content use system according to the second embodiment.
Figure 9:
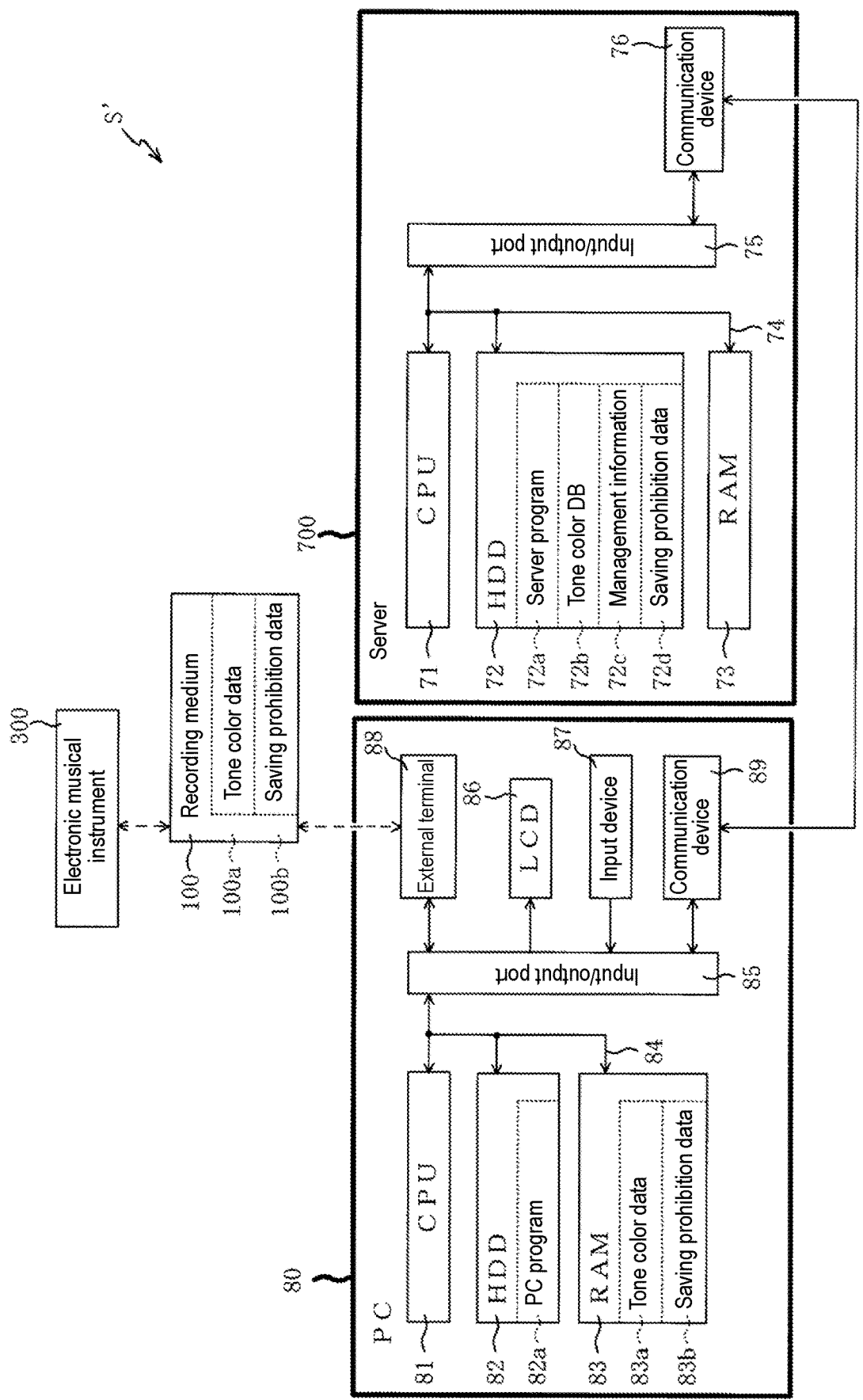
FIG. 9 is a block diagram showing the electrical configurations of the server and the PC of the content use system according to the second embodiment.

Next, the electrical configuration of the content use system S' according to the second embodiment will be described with reference to FIGS. 8 and 9. FIG. 8 is a block diagram showing the electrical configuration of the electronic musical instrument 300 and the recording medium 100 of the content use system S' according to the second embodiment. The electronic musical instrument 300 omits the communication device 36 from the electronic musical instrument 300 of the first embodiment, and instead is provided with an external terminal 44 for connecting to an external device. In this embodiment, the external terminal 44 is a device based on the USB (registered trademark) standard, and is configured to be attachable to and detachable from the recording medium 100.

The recording medium 100 includes tone color data 100*a* that stores tone color data acquired from the PC 80, and saving prohibition data 100*b* that stores saving prohibition data acquired from the PC 80.

Next, the electrical configurations of the server 700 and the PC 80 according to the second embodiment will be described with reference to FIG. 9. FIG. 9 is a block diagram showing the electrical configurations of the server 700 and the PC 80 of the content use system S' according to the second embodiment. The HDD 72 of the server 700 includes, in addition to those included in the HDD 72 of the server 70 of the first embodiment, saving prohibition data 72*d* in which saving prohibition data created by the server 700 based on the purchase status of the management information 72*c* is stored.

The PC 80 has a CPU 81, an HDD 82 and a RAM 83, which are connected to an input/output port 85 via a bus line 84. The input/output port 85 is further connected with the LCD 86 described above, an input device 87 for an instruction from the user H, an external terminal 88 and a communication device 89 for communicating with the server 70.

The CPU 81 is a computing device that controls each part connected by the bus line 84. The HDD 82 is a rewritable non-volatile storage device that stores programs to be executed by the CPU 81, fixed value data, and the like, and stores a PC program 82*a*. When the PC program 82*a* is executed by the CPU 81, the tone color data display processing and the tone color data purchase processing on the server 700 described above with reference to FIG. 9 are executed.

The RAM 83 is a volatile memory for rewritably storing various work data, flags, and the like when the CPU 81 executes a program, and includes tone color data 83*a* in which tone color data acquired from the server 700 is stored, and saving prohibition data 83*b* in which saving prohibition data acquired from the server 700 is stored.

The external terminal 88 is a device for connecting with an external device. In this embodiment, the external terminal 88 is a device based on the USB standard, and is configured to be attachable to and detachable from the recording medium 100.

Figure 10:
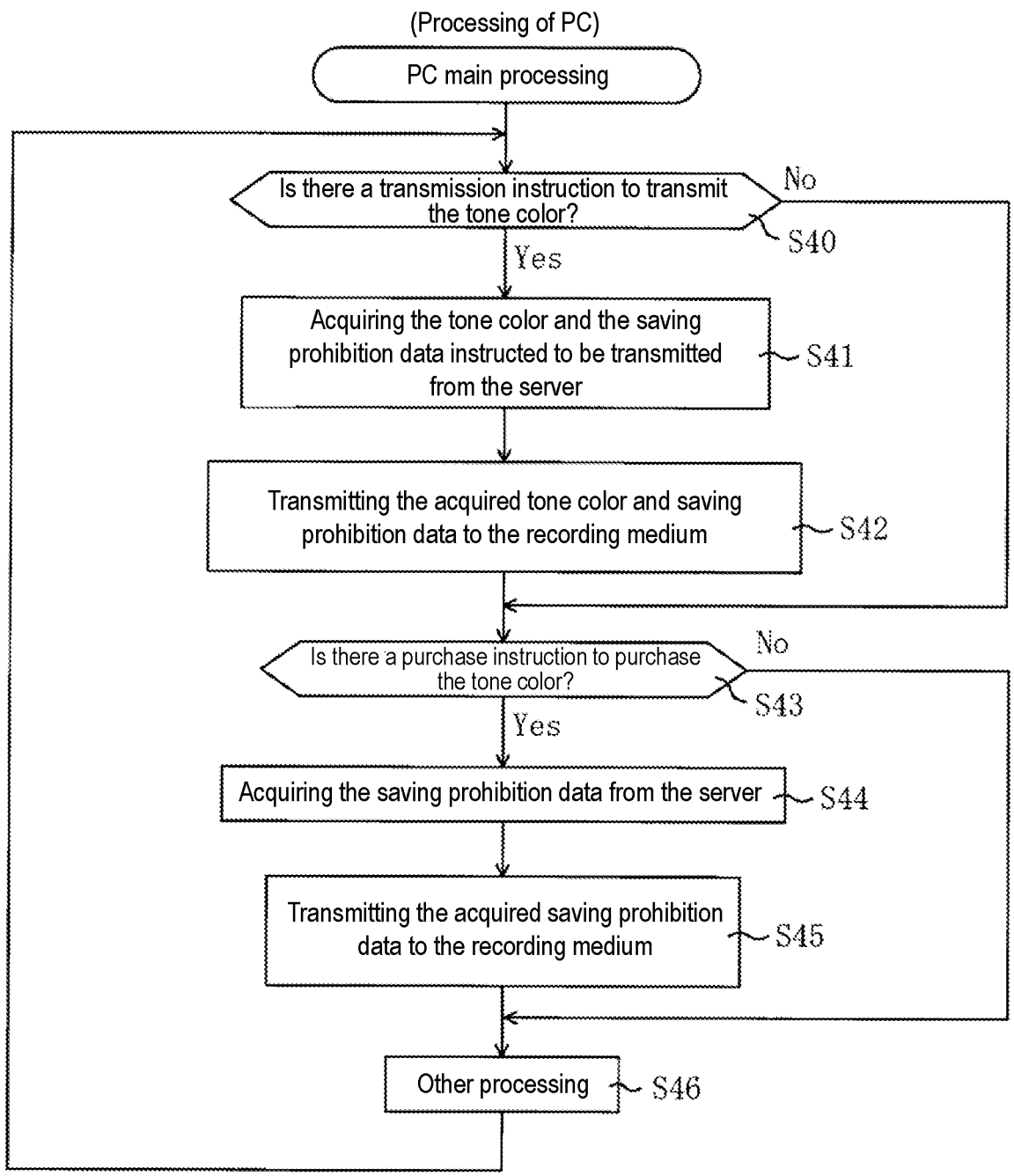
FIG. 10 is a flowchart of the PC main processing according to the second embodiment.

Next, processing executed by the CPU 81 of the PC 80 and processing executed by the CPU 31 of the electronic musical instrument 300 will be described with reference to FIGS. 10 to 12. FIG. 10 is a flowchart of the PC main processing. The PC main processing is processing that is executed when the power of the PC 30 is turned on.

In the PC main processing, first, it is confirmed whether the transmit key 86*e* (see FIG. 7) has been operated to issue a transmission instruction to transmit the tone color data to the recording medium 100 (S40). In the processing of S40, if there is a transmission instruction (S40: Yes), the tone color data and the saving prohibition data instructed to be transmitted from the server 700 are acquired and saved in the tone color data 83*a* and the saving prohibition data 83*b*, respectively (S41).

When the server 700 receives the transmission instruction, it acquires the instructed tone color data and creates saving prohibition data corresponding to the user H who uses the electronic musical instrument 300 for which the transmission instruction is given, based on the management information 72*c*. Then, it transmits the acquired tone color data and the created saving prohibition data to the PC 80 to which the transmission instruction has been transmitted.

After the processing of S41, the tone color data 83a and the saving prohibition data 83b are transmitted to the recording medium 100 via the external terminal 88 (S42). In the recording medium 100, the tone color data and the saving prohibition data transmitted from the PC 80 are saved in the tone color data 100a and the saving prohibition data 100b, respectively.

In the processing of S40, if no transmission instruction is issued (S40: No), the processing of S41 and S42 is skipped.

After the processing of S40 and S42, it is confirmed whether the purchase key 86d is operated to issue a purchase instruction to purchase non-purchased tone color data (S43). In the processing of S43, if there is a purchase instruction (S43: Yes), purchase processing of the target tone color data is performed on the server 700, and saving prohibition data reflecting the purchase processing is acquired from the server 700 and saved in the saving prohibition data 83b (S44).

After the processing of S44, the saving prohibition data stored in the saving prohibition data 83b is transmitted to the recording medium 100 via the external terminal 88 (S45). In the recording medium 100, the saving prohibition data transmitted from the PC 80 is saved in the saving prohibited data 100b.

In the processing of S43, if no purchase instruction is issued (S43: No), the processing of S44 and S45 is skipped. After the processing of S43 and S45, other processing of the PC 80 is executed (S46), and the processing from S40 onward is repeated.

Next, processing of the electronic musical instrument 300 will be described. FIG. 11 is a flowchart of the electronic musical instrument main processing according to the second embodiment. In the processing of S1, if a load instruction is issued (S1: Yes), the tone color data instructed to be loaded is acquired from the recording medium 100 or the tone color memory 32b and copied to the work memory 33a for loading (S70). In the processing of S70, when non-purchased tone color data is loaded, the tone color data is acquired from the tone color data 100a of the recording medium 100 via the external terminal 44, and when purchased tone color data is loaded, the tone color data is acquired from the tone color memory 32b.

After the processing of S70, the saving prohibition data is acquired from the saving prohibition data 100b of the recording medium 100 via the external terminal 44 and saved in the saving prohibition data 32c of the electronic musical instrument 300 (S71). In the second embodiment, the electronic musical instrument 300 may update the saving prohibition data 32c without inquiring to the server 70 by acquiring the saving prohibition data from the recording medium 100. After the processing of S71, the above-described processing from S7 onward is executed.

Figure 12:
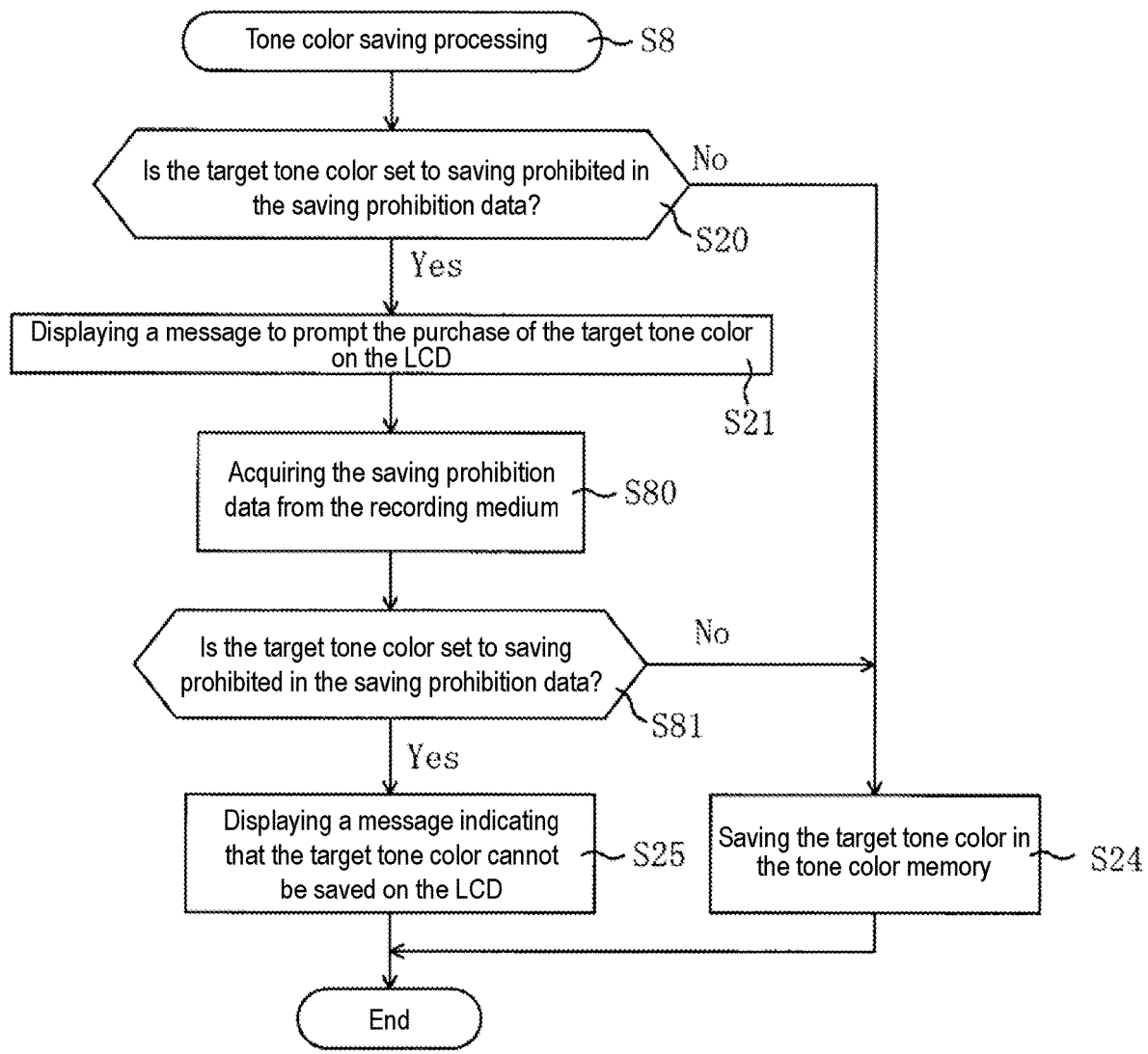
FIG. 12 is a flowchart of the tone color saving processing according to the second embodiment.

FIG. 12 is a flowchart of the tone color saving processing according to the second embodiment. After displaying a message prompting purchase of the target tone color data in the processing of S21, the saving prohibition data is acquired from the saving prohibition data 100b of the recording medium 100 via the external terminal 44 and saved in the saving prohibition data 32c of the electronic musical instrument 300 (S80).

That is, the user H who confirmed the message displayed by the processing of S21 purchases the tone color data through S43 to S45 of FIG. 10, and the saving prohibition data is saved in the recording medium 100 accordingly. In the processing of S80, the saving prohibition data updated along with the purchase of the tone color data is acquired.

Further, like the processing of S22 in FIG. 6, the acquisition of saving prohibition data from the recording medium 100 by the processing of S80 may be performed after a predetermined time (for example, 5 minutes) after the message is displayed in the processing of S21, considering the time required for the user H to issue a purchase instruction to the PC 80 and subsequent saving of the saving prohibition data to the recording medium 100.

After the processing of S80, it is confirmed whether the target tone color data is set to saving prohibited in the saving prohibition data of the saving prohibition data 32c (S81). In the processing of S81, if the target tone color data is set to saving permitted (S81: No), the target tone color data is saved in the tone color memory 32b (S24). On the other hand, in the processing of S81, if the target tone color data is set to saving prohibited (S81: Yes), a message indicating that the target tone color data cannot be saved is displayed on the LCD 36 (S25).

In this way, it is determined whether the tone color data may be saved based on the saving prohibition data acquired from the server 700 via the recording medium 100. In this way, even if the electronic musical instrument 300 cannot directly communicate with the server 700, it is possible to accurately determine whether the tone color data may be saved, and to prevent unauthorized use of the tone color data.

Although the above has been described based on the above embodiments, it may be easily inferred that various improvements and modifications are possible.

In the above-described embodiments, when non-purchased tone color data is stored in the work memory 33a and the purchased tone color data is not saved in the tone color memory 32b, the non-purchased tone color data is deleted from the work memory 33a by turning off the electronic musical instruments 30 and 300, whereby the repeated use of non-purchased tone color data is suppressed. However, the operation is not limited thereto, and the deletion of non-purchased tone color data from the work memory 33a may be performed by other operations.

For example, in the electronic musical instruments 30 and 300, if other tone color data is loaded while one non-purchased tone color data is being trial used, the one non-purchased tone color data that was trial used earlier may be deleted from the work memory 33a. Further, non-purchased tone color data may be deleted from the work memory 33a in accordance with a predetermined operation of the setting keys 35 (for example, simultaneous operation of the up key 35a and the down key 35b). Alternatively, the non-purchased tone color data may be deleted from the work memory 33a after a predetermined time (for example, three hours) has elapsed since the electronic musical instruments 30 and 300 acquired the non-purchased tone color data.

Further, in the first embodiment, an instruction to delete non-purchased tone color data from the work memory 33a is transmitted from the server 70 or the portable terminal 50 to the electronic musical instrument 30, and when the electronic musical instrument 30 receives the instruction, the non-purchased tone color data may be deleted from the work memory 33a.

Further, in the above-described embodiments, the acquired non-purchased tone color data is stored in the work memory 33a, and the non-purchased tone color data on the work memory 33a is put to trial use, but the disclosure is not limited thereto. For example, the acquired non-purchased tone color data may be stored in the tone color memory 32b, and the non-purchased tone color data in the tone color memory 32*b* may be copied to the work memory 33*a*, and the non-purchased tone color data in the work memory 33*a* may put to trial use.

At this time, non-purchased tone color data and purchased tone color data are separately stored in the tone color memory 32*b*. The non-purchased tone color data may be deleted from the tone color memory 32*b* when the acquired non-purchased tone color data has not been purchased for a predetermined period (for example, 10 days). Alternatively, when the non-purchased tone color data stored in the timbre memory 32*b* is not deleted and a predetermined period or longer has elapsed since the non-purchased tone color data was stored in the tone color memory 32*b*, the non-purchased tone color data is prohibited from being copied to the work memory 33*a*. In this way, the use (trial use) of the non-purchased tone color data may be prohibited.

In the above-described first embodiment, an instruction to purchase the tone color data of the server 70 is issued from the portable terminal 50, but the disclosure is not limited thereto. For example, the purchase instruction may be issued from the electronic musical instrument 30, or the purchase instruction may be input directly to the server 70. In these cases, the portable terminal 50 may be omitted from the content use system S. Similarly, in the second embodiment, the instruction to purchase the tone color data is issued from the PC 80, but the disclosure is not limited thereto, and the purchase instruction may be directly input to the server 70.

In the first embodiment, the non-purchased tone color data acquired from the server 70 are displayed in the tone color data lists 36*a* and 56*a*. In the second embodiment, the non-purchased tone color data acquired from the recording medium 100 are displayed in the tone color data lists 36*a* and 86*a*. However, the disclosure is not limited thereto, and non-purchased tone color data displayed in the tone color data lists 36*a*, 56*a*, and 86*a* may be limited.

For example, non-purchased tone color data that the user H has trial used for a predetermined number of times (for example, three times or more) (that is, has selected the trial use keys 36*b* and 56*b* for a predetermined number of times or more) may be excluded from the display objects of the tone color data lists 36*a*, 56*a*, and 86*a*.

Further, non-purchased tone color data for which a predetermined period or longer (for example, 3 days or longer) has elapsed since the user H trial used it (that is, a predetermined period or longer has elapsed since the user H selected the trial use key 36*b* or 56*b*) may be excluded from the display objects of the tone color data lists 36*a*, 56*a*, and 86*a*. In this case, the electronic musical instruments 30 and 300 may be connected to a device such as a real-time clock (RTC) for managing time and date. Further, the accumulated drive time of the electronic musical instrument may be used instead of the predetermined period. In this case, connection of the real-time clock may be omitted. In this way, it is possible to more preferably prevent non-purchased tone color data from being repeatedly acquired and (substantially) permanently used.

In these cases, trial prohibition data, which is information indicating whether to be displayed in the tone color data lists 36*a*, 56*a* and 86*a*, that is, whether trial use is permitted or prohibited, may be set for each non-purchased tone color data. In the trial use prohibition data, non-purchased tone color data whose trial use is permitted is set to trial use permitted to that effect, and non-purchased tone color data whose trial use is prohibited is set to trial use prohibited to that effect.

At this time, in the first embodiment, the trial use prohibition data is stored in the server 70, and trial use permitted or trial use prohibited is set to the trial use prohibition data according to the acquisition of the non-purchased tone color data from the electronic musical instrument 30 or the portable terminal 50 in the server 70, and the trial use prohibition data is transmitted to the electronic musical instrument 30 or the portable terminal 50. The electronic musical instrument 30 or the portable terminal 50 may determine the non-purchased tone color data to be displayed in the tone color data lists 36*a* and 56*a* according to trial use permitted or trial use prohibited of the trial use prohibition data. Alternatively, trial use permitted or trial use prohibited in the trial use prohibition data may be set according to the operation of the trial use keys 36*b* and 56*b* of the electronic musical instrument 30 or the portable terminal 50. In this case, when the trial use prohibition data is updated in the electronic musical instrument 30 or the portable terminal 50, the latest trial use prohibition data may be shared between the electronic musical instrument 30 and the portable terminal 50 through communication between the electronic musical instrument 30 and the server 70 and communication between the portable terminal 50 and the server 70.

Alternatively, irrespective of acquisition of non-purchased tone color data, the server 70 may set the trial use permitted or trial use prohibited of the trial use prohibition data systematically or randomly in a predetermined period. The experience that the desired tone color data is not always displayed motivates the user H to purchase the tone color data for saving when the desired tone color data may be loaded.

Further, in the second embodiment, the trial use prohibition data is stored in the server 700, and trial use permitted or trial use prohibited is set to the trial use prohibition data according to the acquisition of the non-purchased tone color data from the PC 80 in the server 700, and the trial use prohibition data is transmitted to the PC 80. The PC 80 may determine the non-purchased tone color data to be displayed in the tone color data list 86*a* according to trial use permitted or trial use prohibited of the trial use prohibition data. When the non-purchased tone color data is transmitted from the PC 80 to the recording medium 100, the trial use prohibition data is transmitted to the recording medium 100, and the non-purchased tone color data to be displayed in the tone color data list 36*a* may be determined according to trial use permitted or trial use prohibited of the trial use prohibition data transmitted in the electronic musical instrument 300.

In the second embodiment, the tone color data and saving prohibition data of the PC 80 are transmitted to the electronic musical instrument 300 via the recording medium 100, but the disclosure is not limited thereto. For example, the PC 80 and the electronic musical instrument 300 may be communicatively connected, and the tone color data and saving prohibition data of the PC 80 may be transmitted to the electronic musical instrument 300 by communication.

In the first embodiment, saving prohibition data is stored in the saving prohibition data 32*c* of the electronic musical instrument 30, and saving permitted or saving prohibited is set for each piece of tone color data in response to an inquiry to the server 70. However, the disclosure is not limited thereto, and similarly to the second embodiment, the server 70 may set saving prohibition data according to the management information 72*c* and transmit the data to the portable terminal 50 and the electronic musical instrument 30. At this time, the tone color saving processing of the electronic musical instrument 30 may be the same as the tone color saving processing of the second embodiment.

Further, in the above embodiments, the tone color data and the saving prohibition data are provided separately, but the disclosure is not limited thereto. For example, the tone color data may include information as to whether it is permitted to be saved (that is, purchased) or prohibited to be saved (that is, non-purchased). At this time, in the tone color saving processing of the electronic musical instruments 30 and 300, if the target tone color data includes information of saving permitted, the tone color data may be saved in the tone color memory 32b in the same manner as in the processing of S24.

In addition, if the target tone color data includes information of saving prohibited, first, a message prompting purchase of the tone color data is displayed as in the processing of S21. After that, the target tone color data is acquired again, and if the acquired tone color data includes information of saving permitted, the tone color data is saved in the tone color memory 32b in the same manner as in the processing of S24; if the acquired tone color data still includes information of saving prohibited, a message indicating that the target tone color data cannot be saved may be displayed, as in the processing of S25.

In the above embodiments, the names of the tone color data are displayed in the tone color data lists 36a, 56a, and 86a, but the disclosure is not limited thereto. In addition to the name of the tone color data, the purchase status of the tone color data may also be displayed (for example, if the tone color data has already been purchased, "purchased" will be displayed, and if the tone color data has not been purchased, "non-purchased" will be displayed). In addition to the name of the tone color data, it is possible to display whether the tone color data may be put to trial use or not, and whether the tone color data has been saved in the tone color memory 32b of the electronic musical instrument 30 or not.

In the first embodiment described above, the portable terminal 50 is exemplified as a terminal to which the user H inputs an instruction, but the disclosure is not limited thereto. For example, a personal computer (for example, the PC 80 of the second embodiment), a tablet terminal, or the like may be used as the terminal to which the user H inputs instructions. Similarly, in the second embodiment, the PC 80 is exemplified as a terminal to which user H inputs an instruction, but the disclosure is not limited thereto. For example, a portable terminal (for example, the portable terminal 50 of the first embodiment), a tablet terminal, or the like may be used as the terminal to which the user H inputs instructions. In this case, a device for connecting to an external device based on the USB standard, similar to the external terminal 88, may be provided in a portable terminal, a tablet terminal, or the like.

In the above embodiments, the electronic musical instruments 30 and 300 are exemplified as an electronic equipment, but the disclosure is not limited thereto. For example, the electronic equipment may be a video device that processes video. In this case, the server 70 or 700 may save video data, audio data, and data relating to editing such as scene switching as contents.

The numerical values given in the above embodiments are examples, and it is certainly possible to employ other numerical values.

Figure 11:
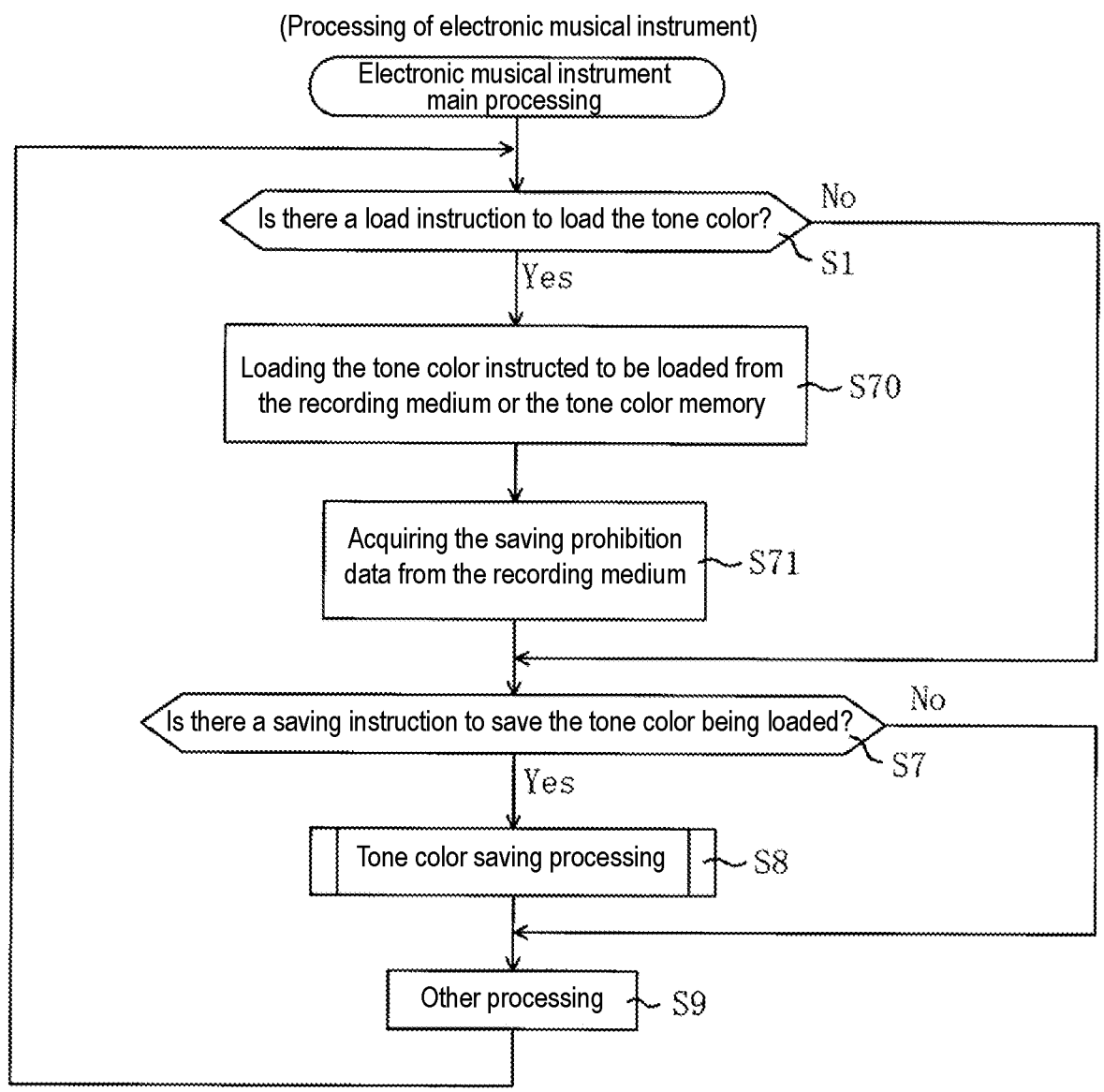
FIG. 11 is a flowchart of the electronic musical instrument main processing according to the second embodiment.

Examples of the content acquisition part are provided by S2 in FIG. 5 and S70 in FIG. 11. An example of the usage part is provided by the usage part 401 of FIG. 2, and more specifically, by S2 in FIG. 5, S70 in FIG. 11, and S9 in FIG. 5 and FIG. 11. An example of the prohibition part is provided by the prohibition part 403 of FIG. 2. An example of the temporary storage part is provided by the work memory 33a of FIG. 3. An example of the content storage part is provided by the tone color memory 32b of FIG. 3. Examples of the utilization part are provided by S2 in FIG. 5, S70 in FIG. 11, and S9 in FIG. 5 and FIG. 11. Examples of the purchase status acquisition part are provided by S3 in FIG. 5, S22 in FIG. 6, S71 in FIG. 11, and S80 in FIG. 12. Examples of the content saving part are provided by S24 in FIG. 6 and S24 in FIG. 12 Examples of the list display part are provided by the tone color data list 36a of FIG. 1 and the tone color data list 36a of FIG. 7.

Figure 3:
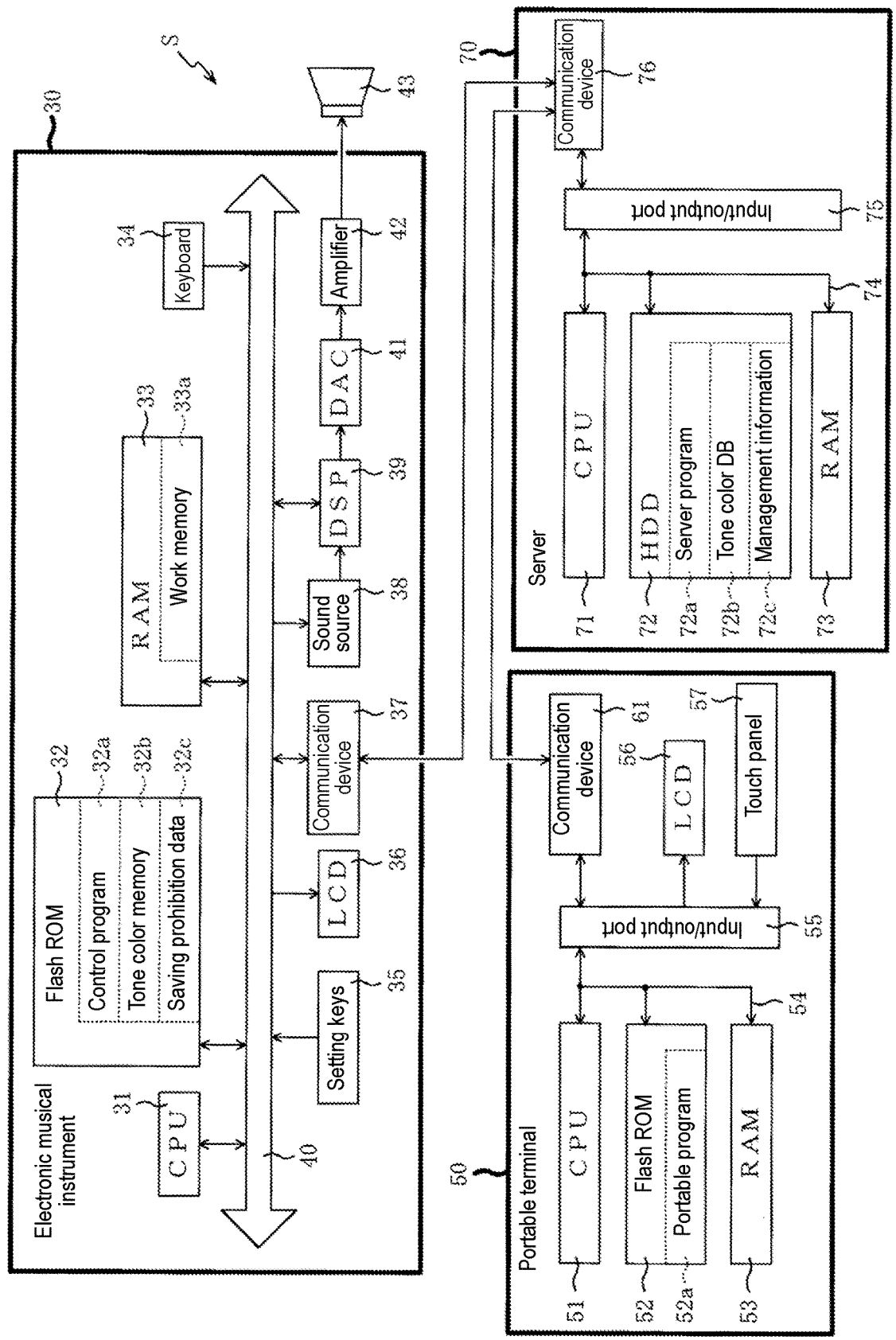
FIG. 3 is a block diagram showing the electrical configuration of the content use system.

The content acquisition part, the usage part, the prohibition part, the temporary storage part, the content storage part, the utilization part, the purchase status acquisition part, the content saving part, the re-acquisition prohibition part, and the list display part are realized by executing the control program 32a by the CPU 31 of FIGS. 3 and 8. However, at least a part of these may be realized by hardware such as an electronic circuit (for example, an FPGA or a dedicated LSI).

What is claimed is:

1. An electronic musical instrument comprising:
   a temporary storage device;
   a non-volatile storage device; and
   a hardware processor coupled to the temporary storage device and the non-volatile storage device and configured to:
   acquire a content including a non-purchased content, which is a content that has not been purchased, from a server, and store the non-purchased content in the temporary storage device;
   use the non-purchased content stored in the temporary storage device regardless of whether the non-purchased content has been purchased or not;
   acquire purchase information indicating whether the non-purchased content has been purchased;
   store the non-purchased content determined to have been purchased according to the purchase information as a purchased content from the temporary storage device into the non-volatile storage device; and
   delete the non-purchased content stored in the temporary storage device in a case that the non-purchased content is not being purchased after being acquired when the electronic musical instrument is turned off or a predetermined operation is performed.

2. The electronic musical instrument according to claim 1, wherein when a non-purchased content acquired for at least one time satisfies a predetermined condition, the hardware processor prohibits re-acquisition of the non-purchased content.

3. The electronic musical instrument according to claim 2, wherein the predetermined condition is that the non-purchased content has not been purchased and that the non-purchased content has been acquired for a predetermined number of times or more.

4. The electronic musical instrument according to claim 2, wherein the predetermined condition is that the non-purchased content has not been purchased and that a predetermined period or longer has elapsed since the non-purchased content was first acquired.

5. The electronic musical instrument according to claim 2, wherein
   the hardware processor further displays a list of the non-purchased content,
   acquires the non-purchased content selected from the list, and
   excludes, from the list, the non-purchased content that has been acquired for at least one time and that satisfies the predetermined condition.

6. The electronic musical instrument according to claim 1, wherein the content is tone color data used by the electronic musical instrument.

7. A non-transitory recording medium for recording a content use program for executing use processing for causing an electronic musical instrument to use a content including a purchased content and a non-purchased content, which is a content that has not been subjected to purchase processing, wherein the electronic musical instrument executes the content use program to:

acquire the content including the non-purchased content, from a server, and store the non-purchased content in a temporary storage device;

use the non-purchased content stored in the temporary storage device regardless of whether the non-purchased content has been purchased or not;

acquire purchase information indicating whether the non-purchased content has been purchased;

store the non-purchased content determined to have been purchased according to the purchase information as the purchased content from the temporary storage device into the non-volatile storage device; and delete the non-purchased content stored in the temporary storage device in a case that the non-purchased content is not subjected to the purchase processing when the electronic musical instrument is turned off or a predetermined operation is performed.

8. A content use method for an electronic musical instrument, the method comprising:

acquiring a content including a non-purchased content, which is a content that has not been purchased, from a server, and temporarily storing the non-purchased content in a temporary storage device;

using the non-purchased content that has been temporarily stored in the temporary storage device indiscriminately regardless of whether the acquired non-purchased content has been purchased or not;

acquiring purchase information indicating whether the non-purchased content has been purchased;

storing the non-purchased content determined to have been purchased according to the purchase information as a purchased content from the temporary storage device into the non-volatile storage device; and deleting the non-purchased content stored in the temporary storage device in a case that the non-purchased content is not subjected to the purchase processing when the electronic musical instrument is turned off or a predetermined operation is performed.

* * * * *